(12) United States Patent
Wang et al.

(10) Patent No.: US 12,314,142 B2
(45) Date of Patent: May 27, 2025

(54) SERVICE/WORKLOAD RECOVERY AND RESTORATION IN CONTAINER ORCHESTRATION SYSTEMS

(71) Applicant: Google LLC, Mountain View, CA (US)

(72) Inventors: Yong Wang, San Jose, CA (US); Maxime Deputter Renaud, Livermore, CA (US)

(73) Assignee: Google LLC, Mountain View, CA (US)

(*) Notice: Subject to any disclaimer, the term of this patent is extended or adjusted under 35 U.S.C. 154(b) by 56 days.

(21) Appl. No.: 18/102,313

(22) Filed: Jan. 27, 2023

(65) Prior Publication Data

US 2024/0256397 A1    Aug. 1, 2024

(51) Int. Cl.
*G06F 11/00* (2006.01)
*G06F 11/14* (2006.01)

(52) U.S. Cl.
CPC ...... *G06F 11/1469* (2013.01); *G06F 11/1464* (2013.01); *G06F 11/1471* (2013.01)

(58) Field of Classification Search
None
See application file for complete search history.

(56) References Cited

U.S. PATENT DOCUMENTS

| | | |
|---|---|---|
| 2016/0065440 A1 | 3/2016 | Nethercutt |
| 2018/0000817 A1 | 3/2018 | Hiyama et al. |
| 2020/0019622 A1* | 1/2020 | Lu .................. G06F 16/137 |
| 2020/0042632 A1 | 2/2020 | Natanzon et al. |
| 2020/0003873 A1 | 12/2020 | Sterns et al. |
| 2021/0157684 A1 | 5/2021 | Marathe et al. |
| 2022/0197687 A1* | 6/2022 | Oki .................. G06F 9/541 |
| 2023/0128602 A1* | 4/2023 | Park .................. G06F 16/288 |
| | | 714/6.3 |

OTHER PUBLICATIONS

Google Scholar/Patents search—text refined (Year: 2024).*
NPL: Google Scholar/Patents search—text refined (Year: 2025).*
"Etcd Backup And Restore In Kubernetes: Step By Step Guide" [online]. Mar. 3, 2022, Retrieved from the internet: <http://k21academy.com/docker-kubernetes/etcd-backup-restore-in-k8s-step-by-step>, 12 pages.
"Kubernetes StatefulSet With Zookeeper" [online] Jan. 28, 2020, Retrieved from the internet: <http://cloudurable.com/blog/kubernetesstatefulsetzookeeperpart1/index.html>, 45 pages.
International Search Report and Written Opinion for PCT Application No. PCT/US2024/013138, dated Apr. 19, 2024. 16 pages.

(Continued)

*Primary Examiner* — Christopher S McCarthy
(74) *Attorney, Agent, or Firm* — Lerner David LLP

(57) ABSTRACT

The disclosed technology comprises a technique and/or mechanism for performing backup/restore and/or DR in cloud computing environments, particularly in environments that make use of K8s. The technique generally includes capturing the create, update, and delete ("CUD") object mutation orders of resources or objects that are proven to be working on a primary site, as well their dependencies, and using those orders and dependencies at a secondary site for restoration.

17 Claims, 10 Drawing Sheets

(56) References Cited

OTHER PUBLICATIONS

Sun, X., et al., "Automatic Reliability Testing for Cluster Management Controllers", Proceedings of the 16th Usenix Symposium on Operating Systems Design and Implementation, Jul. 2022, 18 pages.

Alagappan, R., et al., "Correlated Crash Vulnerabilities", Proceedings of the 12th Usenix Symposium on Operating Systems Design and Implementation, Nov. 2016. 18 pages.

Anonymous. "KV API guarantees" [online]. Retrieved from the internet: <https://etcd.io/docs/v3.3/learning/api_guarantees/. Aug. 2021. 3 pages.

* cited by examiner

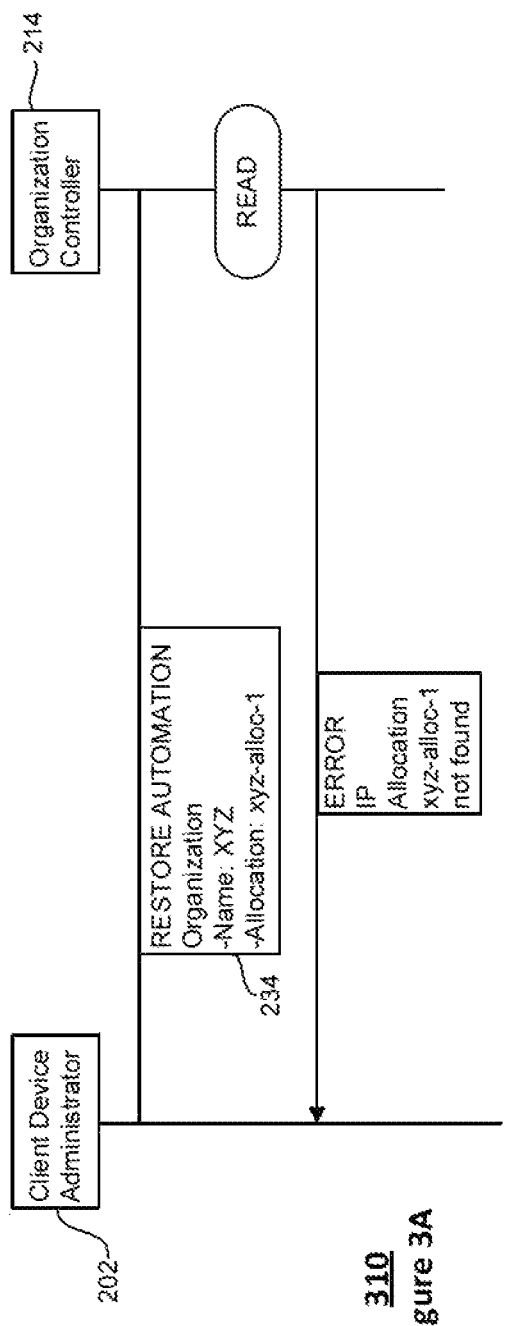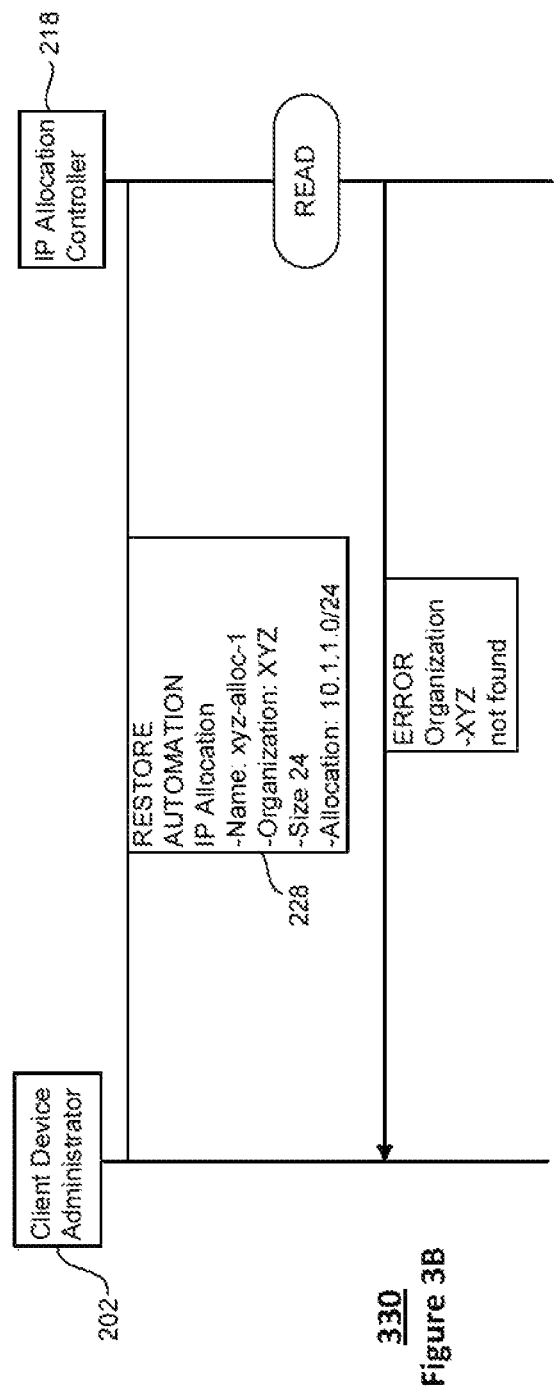
310
Figure 3A
330
Figure 3B

1000

SERVICE/WORKLOAD RECOVERY AND RESTORATION IN CONTAINER ORCHESTRATION SYSTEMS

BACKGROUND

Kubernetes (also known as K8s) is an open-source platform used to deploy, scale, and manage containerized workloads, applications, and/or services. Containers are generally considered lightweight software packages that contain all the dependencies required to execute a contained software application.

Backup/restore and disaster recovery ("DR") are important features for any services/workloads built on top of Kubernetes. These features are supported, for example, in Google Cloud and Google Distributed Cloud Hosted ("GDCH"). For example, in GDCH, which is based on Kubernetes, each instance may consist of many clusters for different users/personas. As such, the cluster plane may include many controllers. These controllers may need to be restored during failover. Ideally, all the controllers are idempotent (e.g., produce the same result if provided with the same value). If true, there is no need for specific orchestration of the restoration order of the various objects (i.e., order need not be maintained) for the restore to succeed as the controllers should be able to reconcile and eventually achieve consistency. In reality, however, many of the controllers are not configured that way (e.g., reconcilable or consistent) and are also often not managed by the same entity; therefore, their idempotency cannot be enforced. As such, where dependencies exist between different resources, deadlock (e.g., making available one resource depends on another resource that is not in place) and restore failures may occur.

SUMMARY

An aspect of the disclosed technology comprises a method or process for restoring a container orchestration system based service. The method or process comprises determining a first order of a plurality of control plane objects that support the container orchestration system based service; determining a dependency between a first control plane object and a second control plane object of the plurality of control plane objects, the first control plane object being associated with a first instant in time and the second control plane object being associated with a second instant in time, the second instant in time occurring after the first instant in time; generating a second order comprising the first control plane object and the second control plane object based on the linear order and the dependency; and using the linear order and the topological order to restore the container orchestration system based service.

In accordance with this aspect of the disclosed technology, the first order may comprises a linear time order.

Further in accordance with this aspect of the disclosed technology, determining the first order may comprise parsing one or more key-value pairs written to a write ahead log (WAL) and creating the first order based on timestamps associated with the key-value pairs (e.g., (key, value)). Further, determining the dependency comprises determining a relationship between the first control plane object and the second control plane object based on first WAL values saved at the first instant in time and second WAL values saved at the second instant in time. In addition, the first instant in time and the second instant in time comprise timestamps associated the first and second WAL values.

Further in accordance with this aspect of the disclosed technology, determining the first order may comprise processing a monotonically increasing integer associated with the CUD orders. Further, each integer is associated with when a given key was added as a member to an etcd state.

Further in accordance with this aspect of the disclosed technology, the container orchestration system based service may comprise one or more applications running in one or more Kubernetes containers. Further, the container orchestration system based service may comprise one or more workloads running in one or more Kubernetes containers.

Further in accordance with this aspect of the disclosed technology, determining the first order may comprise determining a linear order based on one or more object mutations associated with the plurality of control plane objects. In addition, the second order may comprise a topological order.

An aspect of the disclosed technology comprises a for restoring a containerized orchestration based service, comprising: a first set of controllers associated with a containerized orchestration cluster; a key-value database storing key-value pairs for a plurality of control plane objects associated with the containerized orchestration cluster; a memory storing instructions; one or more processing devices coupled to the memory such that the instructions cause the one or more processing to: determine a linear order of the plurality of control plane objects based on the key-value pairs and one or more timestamps associated with the key-value pairs, determine dependencies between the plurality of control plane objects, generate a topological order associated with the plurality of control plane objects based on the linear order and the dependencies; and a backup controller that accesses the topological order and key-value pairs to restore the containerized orchestration based service.

In accordance with this aspect of the disclosed technology, the system may further comprise an application programming interface server. Further, the backup controller may access the topological order and key-value pairs through the application programming interface server. In addition, the backup controller may access the topological order and key-value pairs without using the application programming interface server.

In accordance with this aspect of the disclosed technology, the containerized orchestration based service is implemented in a Kubernetes (K8s) system and the backup controller is associated with another K8s cluster different than the K8s cluster. Further, the linear order may comprise a linear time order.

In accordance with this aspect of the disclosed technology, the instructions cause the one or more processing devices to determine the linear order by parsing the one or more key-value pairs when written to a write ahead log (WAL) and creating the linear order based on timestamps associated with when the key-value pairs are written to the WAL. Further, the instructions may cause the one or more processing devices to determine the dependencies by determining a relationship between a first control plane object and a second control plane object based on first WAL values saved at a first instant in time and second WAL values saved at a second instant in time. In addition, the first instant in time and the second instant in time comprise timestamps associated with the first and second WAL values.

BRIEF DESCRIPTION OF THE DRAWINGS

FIGS. 3A and 3B illustrate how a deadlock may arise if restoration is required for the resource allocation example of FIG. 2.

DETAILED DESCRIPTION

Figure 1:
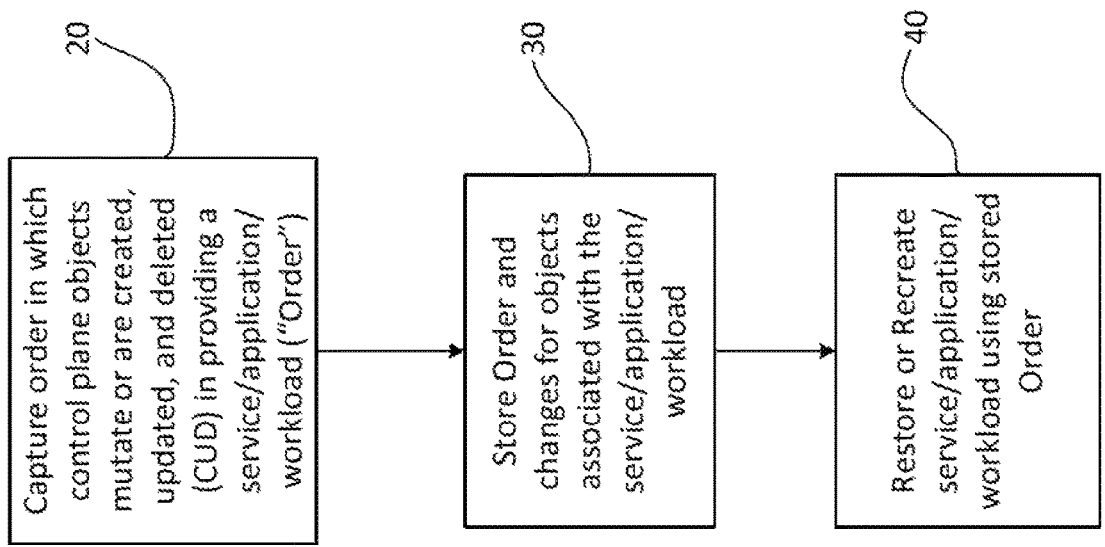
FIG. 1 depicts a process flow in accordance with an aspect of the disclosed technology.

The disclosed technology comprises a technique and/or mechanism for performing backup/restore and/or DR in cloud computing environments, particularly in containerized orchestration environments such as, for example, K8s. The technique generally includes capturing the order of modifications associated with control plane objects, e.g., object mutations caused by changes in the abstract value of an object, in a container orchestration system. The technique may be generally regarded as capturing the order of create, update, and delete ("CUD") operations/transactions associated with resources or objects that are proven to be working on a primary site, as well their dependencies, and using the orders and dependencies at a secondary site for restoration. More specifically, a linear time order of the object mutations or CUD operations/transactions and the dependencies between the mutations or operations/transactions over time are tracked, recorded, and used to create an ordered series. The series may comprise a linear or topological order. The order may then be used in performing backup/restore and/or DR at another site or cluster.

In one example, the technology may be implemented based on etcd, which is a distributed content database used to save control plane objects in Kubernetes. etcd supports a Write Ahead Log (WAL) feature to which key-value (k, v) pair data is first saved before being saved to etcd on a primary cluster. In accordance with this implementation, the contents of each entry destined for the WAL are parsed and a linear order for all objects/resources that mutate or are CUDed is created and stored. A dependency between all objects associated with the current WAL and the previous WAL is also created and stored. The linear order for a given WAL and the dependencies between it and a preceding WAL may comprise a topological or linear order associated with the control plane objects associated with, for example, a K8s cluster. The topological or linear order associated with the control plane objects can be used to restore the objects on a second site.

For instance, an object may comprise a Pod including one or more containers with shared storage and network resources. In deploying the Pod, CUD operations would result in various control plane objects that are captured in one or more WALs. After initial deployment, the state of the Pod may change such that resources are added or deleted so that the Pod may maintain a desired state. Such changes result in updates or mutations to the control plane objects, which are then captured in subsequent WALs. In accordance with this implementation, the linear order in which resources were initially deployed and updated to maintain the desired state of the Pod is tracked and recorded. For example, the linear order may comprise information indicating that a firewall was initially put in place first to allow traffic between a certain source device and a node housing the Pod, but the firewall was modified once the Pod was up and running so that the source device can no longer access the Pod. If the Pod needs to be restored, since the order in which these events occurred is captured and stored, that order can be used for the restore process.

As another example, this implementation may also be used to capture cross-cluster dependency. Specifically, since the timestamps captured inside a WAL are globally monotonically increasing, the timestamps can be used to determine that a resource from a root-admin cluster may need to be created before an object in an organization cluster (e.g., a cluster managed by a different operator for a particular organization). By creating a linear order based on the WAL and tracking the dependencies of objects between WALs, the order will indicate that the root-admin cluster needs to be to created before an organization cluster.

In another example, the technology may be implemented within Kubernetes by leveraging etcd's node.createdIndex, which is a unique integer, that is incremented monotonically, and created for each change to etcd to differentiate CUD or object mutation orders. Each index value reflects the point in the etcd state member at which a given key was created. Using this index value, a linear time order of the object mutations or CUD transactions and the dependencies between the orders over time is tracked and recorded to create a topological order.

As another example, Infrastructure as Code (IaC) configurations are modeled and deployed as Kubernetes objects using high-level configuration language. The configuration state/manifest files are stored and version-controlled in a source control management (SCM) such as GitHub. In this example, the technology may be implemented by leveraging ConfigSync's depends_on to determine and apply an order.

FIG. 1 illustrates a process 10 in accordance with an aspect of the disclosed technology. The process 10 is directed to restoration or recovery of a service, application, or workload that is running within a container orchestration environment or system. Such systems generally provide services relating to deployment, scaling and management of containers. A containers may be considered an executable unit of software in which code associated with an application is packaged. The process 10 comprises capturing the order in which control plane objects mutate or are CUDed for a service (block 20). The order, for instance, may include a time-ordered sequence in which network connections and associated containers in a K8s cluster were established in initially setting up the service. In addition, the order information may include the order in which control plane objects associated with the service are subsequently updated once initially provisioned. As the states of the objects associated with the service changes, the order is captured at block 20. At block 30, the captured order may then be stored. At block 40, the stored captured order may be used to restore or recreate the service/application/workload in another cluster in response to performance issues.

Figure 2:
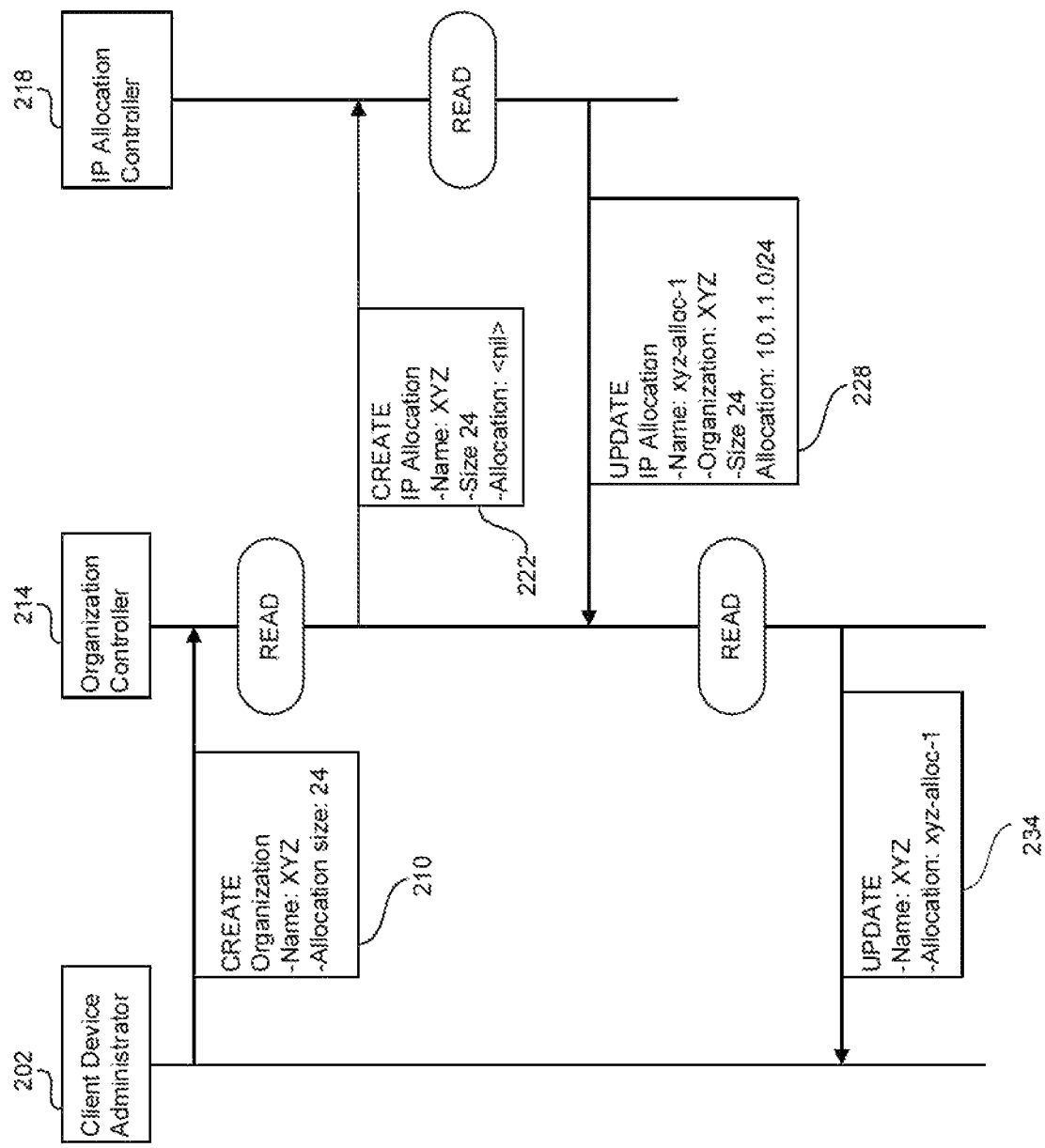
FIG. 2 depicts an example of a process to illustrate a resource allocation in K8s.

FIG. 2 shows a use case example 200 of creation of control plane objects associated with an IP address allocation. In the example 200, two resources are being created—an organization and an IP address. As shown, an administrator requests creation of an IP address allocation for the organization via client device 202, which results in creation of an organization request object 210. The object 210 includes the organization's name (XYZ), the size of the IP address allocation (24), and an allocated IP address field (which is set to nil as this is information that is requested and yet to be provided). The object 210 comprises input that is read by the organization controller or processing device 214 within the organization's or administrator's network.

The organization controller 214 issues a request for creation of the IP address allocation from a K8s IP allocation controller 218 via IP allocation object 222. The IP allocation object 222 includes a name identifying the allocation, the organization requesting the allocation, the allocation size requested, and allocation or IP address field (which has a value of nil). The IP allocation controller 218 thereafter causes an IP address to be allocated (e.g., 10.1.1.0/24) to the organization as indicated via IP allocation object 228. The organization controller 214 thereafter reads IP allocation object 228 and updates the organization's records to store the name of the allocation object via updated organization object 234. FIG. 2 illustrates a time order of the CREATE and UPDATE object mutations on an "Organization" object and an "IP Allocation" object. As the ordered mutations concern two different objects, there is a dependence between these two objects. If the time order and the dependence are not adhered to during a subsequent backup/restore process, this could lead to a deadlock situation as is shown in FIGS. 3A and 3B.

FIGS. 3A and 3B illustrate two restoration requests for the IP allocation created to illustrate possible deadlocks. Specifically, FIG. 3A shows a process flow 310 for a request to restore the previously created organization object 234 with IP address allocation ("xyz-alloc-1") for the organization. The process flow 310 ultimately returns an ERROR indicating that the requested organization object cannot be created because the IP address allocation does not yet exist. FIG. 3B shows a process flow 330 for a request to restore the previously created allocation object 228. The process flow 330 returns an ERROR that the organization XYZ cannot be found because the XYZ organization object does not yet exist.

Figure 4:
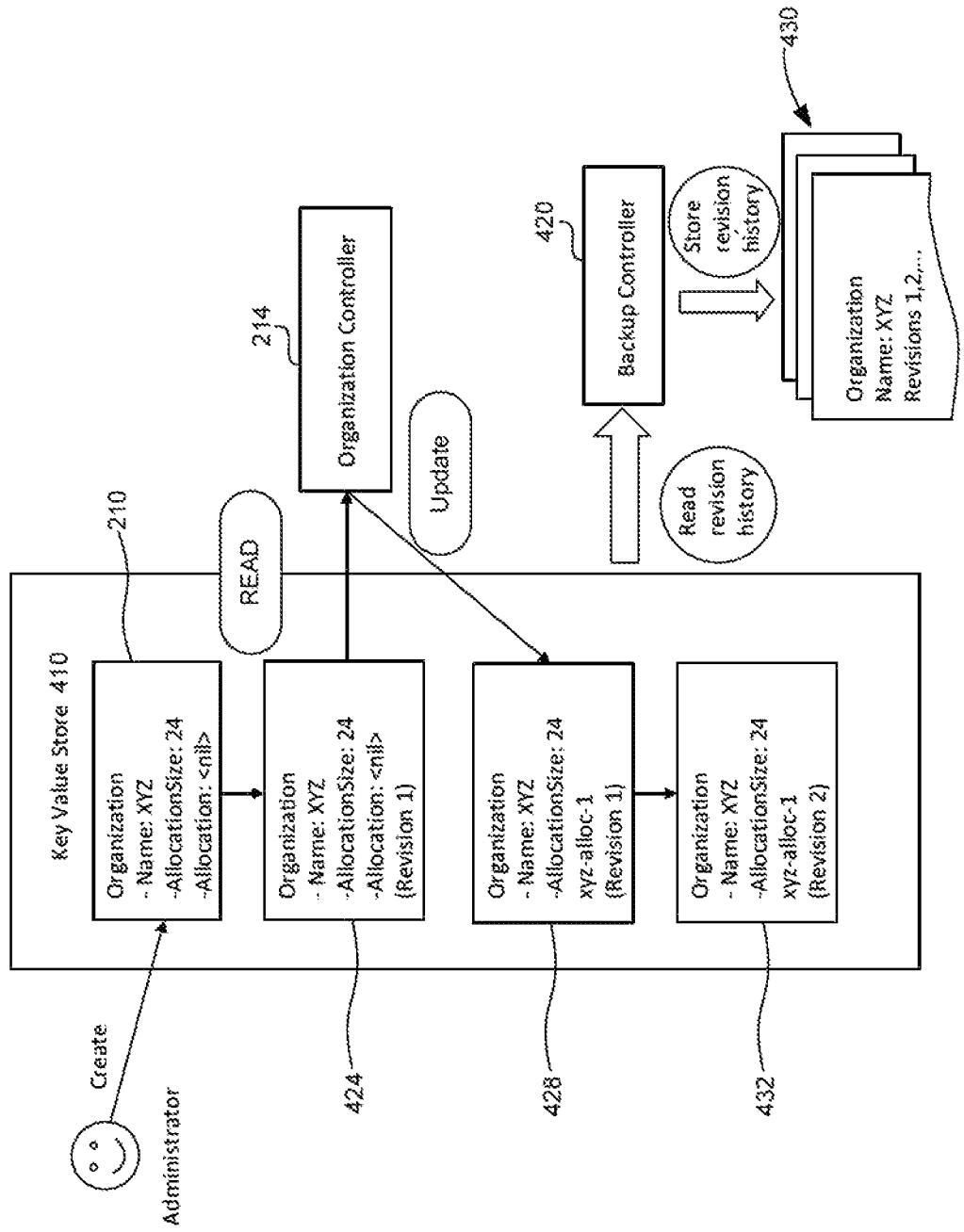
FIG. 4 depicts an example of a process flow in accordance with an aspect of the disclosed technology.

FIG. 4 illustrates a process flow 400 in accordance with an aspect of the disclosed technology based on the example use case of FIG. 2. FIG. 4 is an example that illustrates the technology in the context of an organization object and is meant to represent how the backup journey of the organization object progresses. FIG. 4 shows an example use case of the technology. It does not show, for example, how an IP range is allocated by the IP Allocation controller, which may comprise another use case of the technology. As shown in FIG. 4, key-value storage system 410 may be used by a backup controller 420 to build an ordered history of objects associated with the IP address allocation request for the organization. Specifically, a first timestamp is associated with the object 210, a second timestamp with IP allocation object 424 created within K8s for the organization, a third timestamp with updated IP allocation object 428 and fourth timestamp with updated IP allocation object 432. The timestamps and revisions made to the objects in the K8s environment comprise a revision history that is sent to backup controller 420 and processed (e.g., read). Backup controller 420 then stores the revision history as time-ordered series 430.

Figure 5:
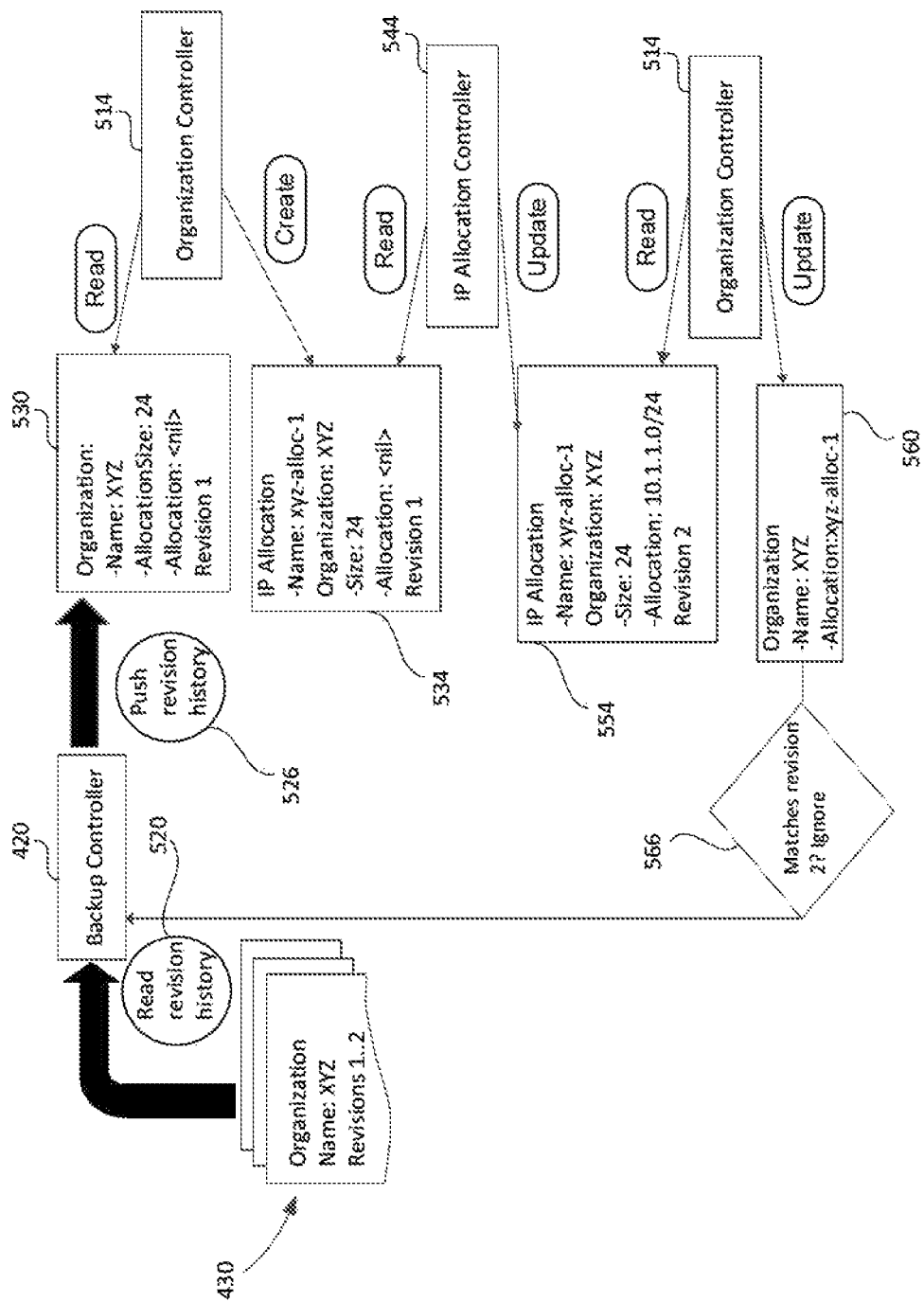
FIG. 5 depicts an example of a process flow in accordance with an aspect of the disclosed technology.

As shown in FIG. 5, the time-ordered series 430 may be used in restoral process 500 to replicate the IP allocation build in a new cluster as part of backup restore or DR. More specifically, FIG. 5 shows how an organization object can be restored in accordance with an aspect of the disclosed technology and how deadlock (FIG. 3A) can be prevented. In FIG. 5, the organization controller 514 reads the organization object once, then updates it once. FIG. 5 illustrates that by putting revision 1 for an "organization" object, the deadlock is avoided, while still ensuring that revision 2 is conformed to the backup (after the IP allocation controller 544 allocates the IP). The sequence of steps illustrated in FIG. 5 follow the time order and dependences illustrated in FIG. 2.

As shown in FIG. 5, the restoral process 500 is initiated with a read operation 520 of the time-ordered series 430 by backup controller 420. In keeping with the example of FIG. 4, there are two revisions in the time-ordered series, although one skilled in the art would understand that in a typical use case there may be more, even many more, than two revisions. Backup controller 420 also pushes the revision history 526 to the organization controller 514 as a time-ordered series.

Organization controller 514 then reads the revision history starting with the organization object (revision 1) 530 and creates an IP allocation object 534. The IP allocation object 534 is then read by IP allocation controller 544. IP allocation controller 544 then updates IP allocation object 554, but does so with reference to revision 2 so that the IP allocation is restored to match the original allocation. Organization controller 514 then reads IP allocation object 554 and updates the organization object 560 to indicate the IP allocation (e.g., 10.1.1.0/24). The backup controller 420 checks the organization object 560 at decision diamond 566 to determine whether the organization object 560 matches revision 2. If there is a match, then the restoration process is considered completed, e.g., the object has been fully restored. If there is no match, backup controller 420 may reinitiate processing so that the object may be fully restored.

Figure 6:
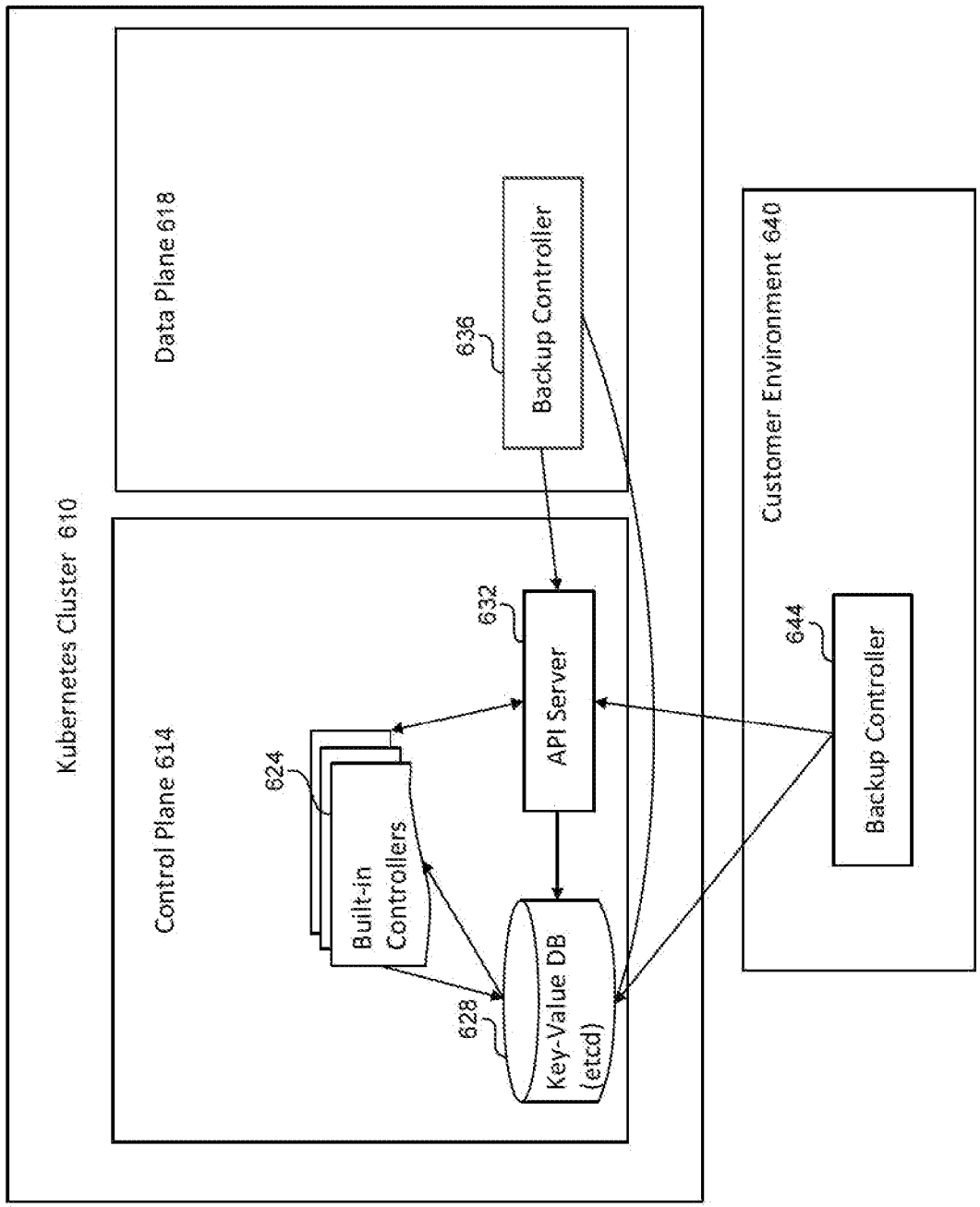
FIG. 6 depicts an example of a system architecture in accordance with an aspect of the disclosed technology.

Turning now to FIG. 6, which depicts an example of a system architecture 600 in accordance with an aspect of the disclosed technology. The system includes a K8s cluster 610, which includes a control plane 614 and a data plane 618. The control plane 614 includes one or more controllers 624, a key-value database 628, and an API server 632. The data plane 618 includes a backup controller 636. The system also includes customer environment 640, which includes a backup controller 644. Cluster 610 will typically include other components such as a set of worker machines, e.g., referred to as nodes, that run containerized applications. The worker node(s) host relatively small deployable units of computing, e.g., generally referred to as Pods, that function as components of the application workload. The control plane 614 will also typically include a controller manager that runs the controllers.

API server 632 is a control plane component that exposes the K8s API. The K8s API functions to query and manipulate the state of K8s objects. API server 632 is coupled to one or more built-in controllers 624. Each of controllers 624 may comprise a separate process. Examples of some type of controllers include a node controller (monitors nodes and responds when a node goes down), a job controller (watches for job objects and creates Pods to run tasks associated with jobs), and a Service Account controller (creates default service account for namespaces). Controllers 624 are communicatively coupled to a key-value database 628. Key-value database 628 comprises a database that stores the serialized state of objects associated with controllers 624. In some examples, key-value database 628 may comprise an etcd. Generally, K8s objects comprise persistent entities that are used to represent the state of a cluster. For example, the objects may describe which containerized applications are running (and on which nodes), the resources available to those applications, or the policies around governing how those applications behave (e.g., restart policies, upgrades, fault-tolerance). In effect, an object represents a desired state. The K8s API, via API server 632, allows for the creation, modification, and deletion of objects.

As previously mentioned, etcd supports a Write Ahead Log (WAL) feature to which key-value (k, v) pair data is first saved before being saved to etcd on the primary cluster. In accordance with an aspect of the disclosed technology, the contents of each entry destined for the WAL are parsed and a linear order for all objects/resources that are CUDed is created and stored. A dependency between all objects associated with the current WAL and the previous WAL is also created and stored. The linear order for a given WAL and the dependencies between it and a preceding WAL comprises an order or ordered series associated with the control plane objects associated with, for example, a K8s cluster. That order can be used to restore the objects on a second site.

More generally, as objects are created, modified, or deleted within the control plane, the key-value pair and a timestamp associated with each change to an object is stored or logged prior to the change being applied. In addition, the relationship between changes to objects is also determined and stored, e.g., one task must be performed before another, so as to reflect topological or linear ordering. The timestamping of the key-value pairs and the order then allows for recreation of the objects representing the state of a cluster, in the event that restoration of the cluster is needed. In this regard, key-value database 628 therefore also stores the dependencies between objects, as well key-value pairs associated with the creation, modification and deletion of objects.

Figure 7:
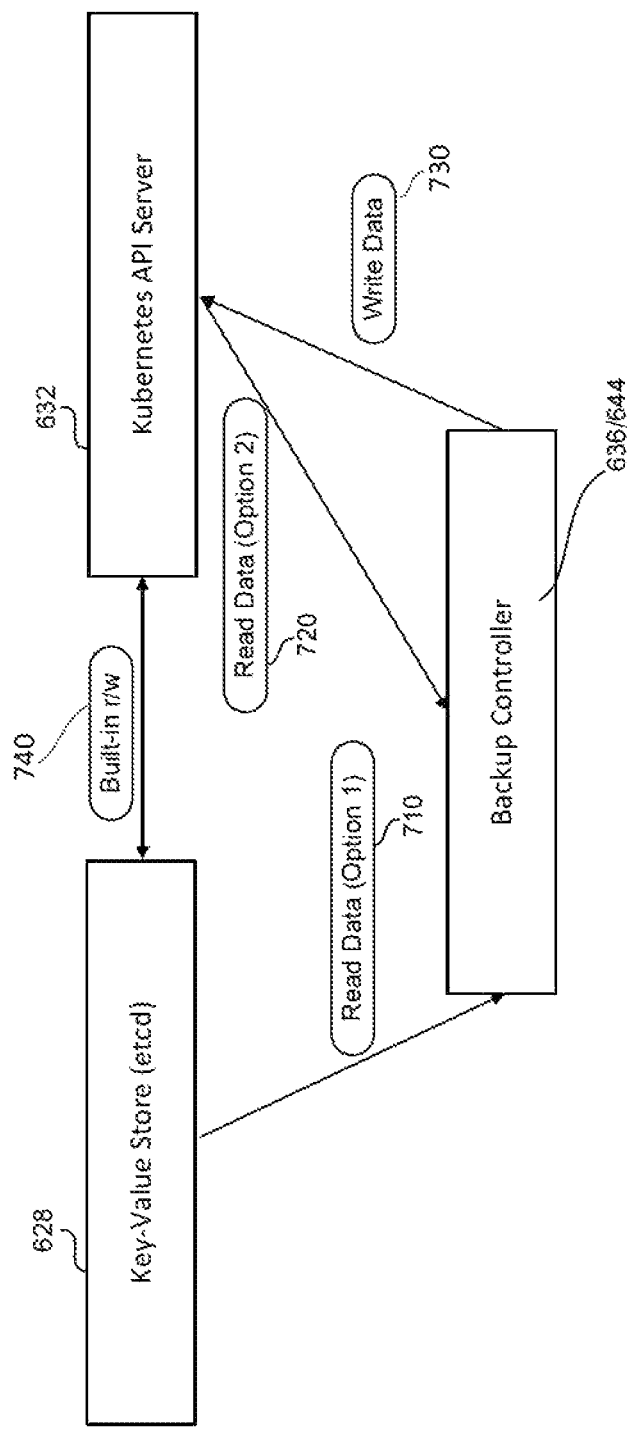
FIG. 7 depicts an example of a system architecture in accordance with an aspect of the disclosed technology.

As is also shown in FIG. 6, both backup controllers 644 and 636 are coupled to key-value database 628, either through API server 632 or independent of API server 632. These two options are shown in FIG. 7. As shown read option 1 (710) accesses key-value database 628 independent of the API server 632. Read option 2 (720) uses API server 632 to obtain the key-value pairs and linear or topological order. Backup controllers 644 and 636, using either option, may therefore read or retrieve the key-value pairs and topological order stored on key-value database 628. The retrieved key-value pairs and linear or topological order may then be used to restore or recreate the clusters associated with Kubernetes cluster 610. As is also shown in FIG. 7, the backup controller 644/636 may also write the key-value data 730 it reads to the API server 632, which may provide that information to the organization controller.

As indicated via built-in read/write operation 740, the K8s API reads and writes data to etcd 628 in accordance with the normal operations within the K8s framework. The controllers in a K8s network have no control over the Kubernetes API. Similar to how Windows writes data to disk, once a software makes an API call to Windows to write the data, the software need not be involved with the actual disk write. Kubernetes controllers work similarly. As such, all their integrations are normally done via the KubeAPI, which abstracts the etcd implementation.

Figure 8:
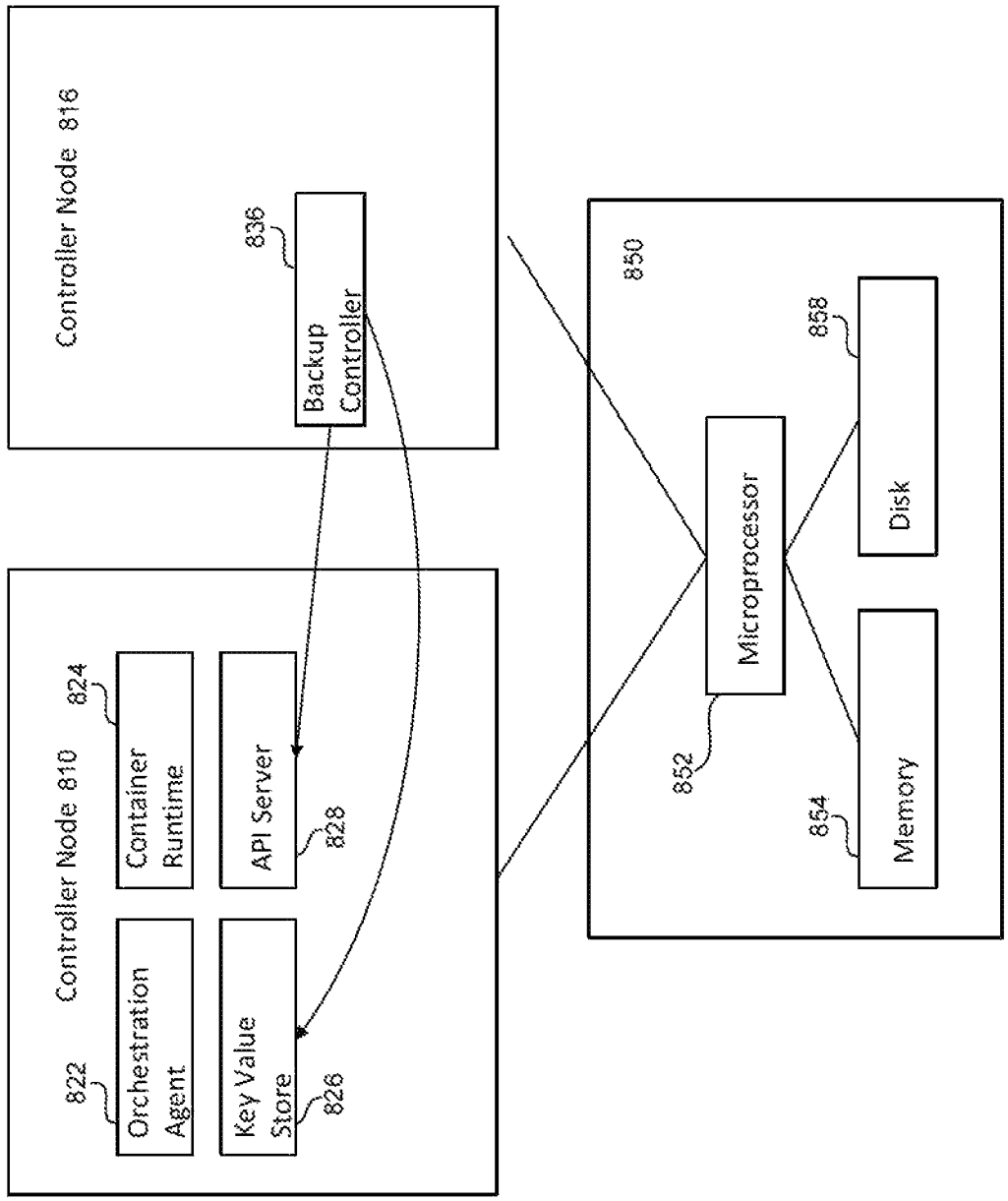
FIG. 8 depicts an example of a system architecture in accordance with an aspect of the disclosed technology.

FIG. 8 depicts an example of a system architecture 800 in accordance with an aspect of the disclosed technology. The system architecture 800 depicts a first controller node 810 that is backed up by a second controller node 816 in a K8s system. The first controller node 810 includes an orchestration agent 822, a container runtime 824, a key-value store 826 and an API server 828. Orchestration agent 822 operates using a set of Pod specifications associated with the Pods running on the node associated with controller node 810. The orchestration agent 822 ensures that the containers described via the Pod specifications are running and healthy. Container runtime 824 comprises the software responsible for running the containers associated with the node. Key-value store 826 and API server 828 operate as discussed above. Backup controller 836 is associated with the second controller node 816.

The system architecture 800 also comprises a computing device 850. Computing device 850 comprises a processing element 852 (e.g., a microprocessor), memory 854, and disk or storage 858. Computing device 850 comprises a computing device in a customer environment. Memory 854 stores instructions that cause processing element 852 to request services, and updates to such services, to the controller node 810. Disk or storage 858 may comprise a database that is used to store the key-value pairs and linear order or topological information received from key-value store 826. In operation, backup controller 836 functions to obtain the key-value pairs and order stored in key-value store 826 via API server 828 or from key value store 826. In response to a request from computing device 850 to restore controller node 810, backup controller 836 uses the key-value pairs and order to recreate the K8s environment that previously existed via controller node 810.

Figure 9:
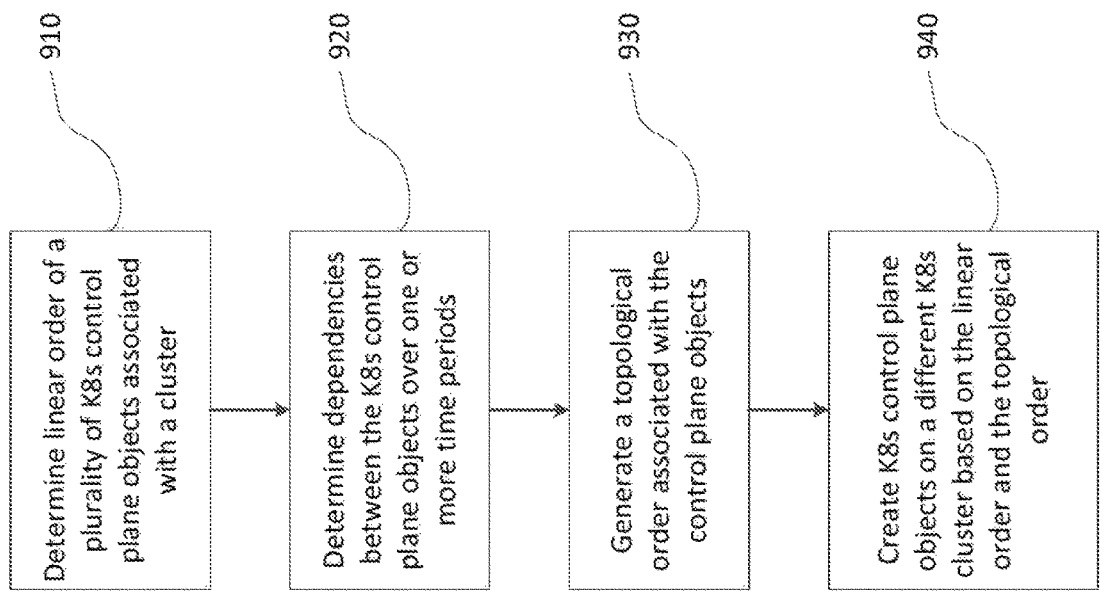
FIG. 9 depicts a process flow in accordance with an aspect of the disclosed technology.

FIG. 9 depicts a process flow 900 in accordance with an aspect of the disclosed technology. At step or block 910, a linear order associated with a plurality of K8s control plane objects is determined. In some examples, the linear order comprises a time order of key-value pairs associated with CUD operations associated with the control plane objects associated with a cluster. The time order may be determined based on timestamps associated with the key-value pairs as they are written to WAL or to a database.

At step or block 920, dependencies between the K8s control plane objects are determined over one or more time periods. At block 930, the dependencies are used to generate a topological or linear order associated with the control plane objects. As discussed above, the topological order represents relationships between changes to control plane objects. At block 940, the linear order and/or topological order are used to recreate or restore the K8s control plane objects as part of backup/restore or DR operations.

Figure 10:
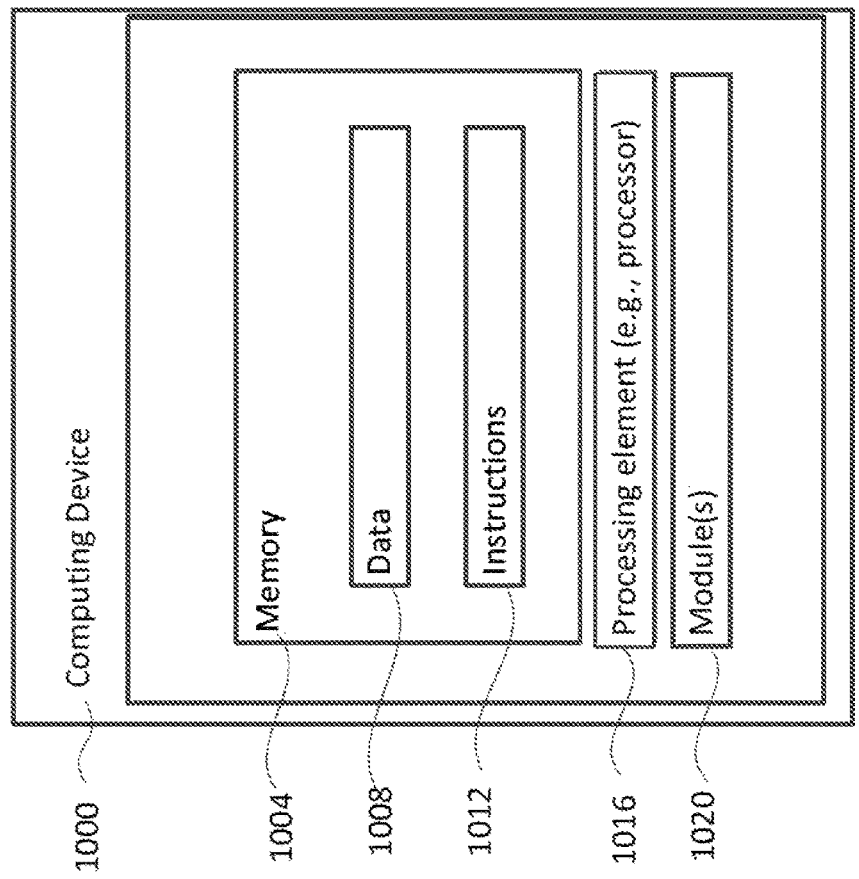
FIG. 10 depicts an example of a computing device in accordance with an aspect of the disclosed technology.

FIG. 10 depicts an example of computing device 1000 that may be used to carry out various aspects of the disclosed technology. For example, the computing device 1000 may be used to implement the processes discussed above, including the processes depicted in FIGS. 1 and 9. Computing device 1000 may also be used as computing device 850. In addition, computing device 1000 may comprise the controllers in the K8s environment or nodes. Computing device 1000 may also comprise the API server discussed above.

The computing device 1000 can take on a variety of configurations, such as, for example, a controller or microcontroller, a processor, or an ASIC. In some instances, computing device 1000 may comprise a server or host machine that carries out the operations discussed above. In other instances, such operations may be performed by one or more of the computing devices in a data center. The computing device may include memory 1004, which includes data 1008 and instructions 1012, and a processing element 1016, as well as other components typically present in computing devices (e.g., input/output interfaces for a keyboard, display, etc.; communication ports for connecting to different types of networks).

The memory 1004 can store information accessible by the processing element 1016, including instructions 1012 that can be executed by processing element 1016. Memory can also include data 1008 that can be retrieved, manipulated, or stored by the processing element 1016. The memory 1004 may be a type of non-transitory computer-readable medium capable of storing information accessible by the processing element 1016, such as a hard drive, solid state drive, tape drive, optical storage, memory card, ROM, RAM, DVD, CD-ROM, write-capable, and read-only memories. The processing element 1016 can be a well-known processor or other lesser-known types of processors. Alternatively, the processing element 1016 can be a dedicated controller such as an ASIC.

The instructions 1012 can be a set of instructions executed directly, such as machine code, or indirectly, such as scripts, by the processor 1016. In this regard, the terms "instructions," "steps," and "programs" can be used interchangeably herein. The instructions 1012 can be stored in object code format for direct processing by the processor 1016, or can be stored in other types of computer language, including scripts or collections of independent source code modules that are interpreted on demand or compiled in advance. For example, the instructions 1012 may include instructions to carry out the methods and functions discussed above in relation to generating data quality annotations, metrics, etc.

The data 1008 can be retrieved, stored, or modified by the processor 1016 in accordance with the instructions 1012. For instance, although the system and method are not limited by a particular data structure, the data 1008 can be stored in computer registers, in a relational database as a table having a plurality of different fields and records, or in XML documents. The data 1008 can also be formatted in a computer-readable format such as, but not limited to, binary values, ASCII, or Unicode. Moreover, the data 1008 can include information sufficient to identify relevant information, such as numbers, descriptive text, proprietary codes, pointers, references to data stored in other memories, including other network locations, or information that is used by a function to calculate relevant data.

FIG. 10 functionally illustrates the processing element 1016 and memory 1004 as being within the same block, but the processing element 1016 and memory 1004 may instead include multiple processors and memories that may or may not be stored within the same physical housing. For example, some of the instructions 1012 and data 1008 may be stored on a removable CD-ROM and others may be within a read-only computer chip. Some or all of the instructions and data can be stored in a location physically remote from, yet still accessible by, the processing element 1016. Similarly, the processing element 1016 can include a collection of processors, which may or may not operate in parallel.

The computing device 1000 may also include one or more modules 1020. Modules 1020 may comprise software modules that include a set of instructions, data, and other components (e.g., libraries) used to operate computing device 1000 so that it performs specific tasks. For example, the modules may include scripts or programs to implement functions to perform one or more of the CUD operations, automate restore functionality, or restore a K8s cluster using a backup controller.

Aspects of the disclosed technology may be embodied in a method, process, apparatus or system. Those examples may include one or more of the following features (e.g., F1 through F20):

F1. A method for restoring a container orchestration system based service, comprising:
   determining a first order of a plurality of control plane objects that support the container orchestration system based service;
   determining a dependency between a first control plane object and a second control plane object of the plurality of control plane objects, the first control plane object being associated with a first instant in time and the second control plane object being associated with a second instant in time, the second instant in time occurring after the first instant in time;
   generating a second order comprising the first control plane object and the second control plane object based on the first order and the dependency; and
   using the first order and a topological order to restore the container orchestration system based service.

F2. The method of F1, wherein the first order comprises a linear time order.

F3. The method of any one of F1 and F2, wherein determining the first order comprises parsing one or more key-value pairs written to a write ahead log (WAL) and creating the first order based on timestamps associated with the key-value pairs.

F4. The method of any one of F1 to F3, wherein determining the dependency comprises determining a relationship between the first control plane object and the second control plane object based on first WAL values saved at the first instant in time and second WAL values saved at the second instant in time.

F5. The method of any one of F1 to F3, wherein the first instant in time and the second instant in time comprise timestamps associated the first and second WAL values.

F6. The method of any one of F1 to F5, wherein determining the first order comprises processing a monotonically increasing integer associated with the CUD orders.

F7. The method of any one of F1 to F6, wherein each integer is associated with when a given key was added as a member to an etcd state.

F8. The method of any one of F1 to F7, wherein the container orchestration system based service comprises one or more applications running in one or more Kubernetes containers.

F9. The method of F1, wherein the container orchestration system based service comprises one or more workloads running in one or more Kubernetes containers.

F10. The method of any one of F1 to F9, wherein determining the first order comprises determining a linear order based on one or more object mutations associated with the plurality of control plane objects.

F11. The method of any one of F1 to F10, wherein the second order comprises a topological order.

F12. A system for restoring a containerized orchestration based service, comprising:
   a first set of controllers associated with a containerized orchestration cluster;
   a key-value database storing key-value pairs for a plurality of control plane objects associated with the containerized orchestration cluster;
   a memory storing instructions;
   one or more processing devices coupled to the memory such that the instructions cause the one or more processing to:
      determine a linear order of the plurality of control plane objects based on the key-value pairs and one or more timestamps associated with the key-value pairs, determine dependencies between the plurality of control plane objects,
generate a topological order associated with the plurality of control plane objects based on the linear order and the dependencies; and
a backup controller that accesses the topological order and key-value pairs to restore the containerized orchestration based service.

F13. The system of F12, further comprising an application programming interface server.

F14. The system of any one of F12 and F13, wherein the backup controller accesses the topological order and key-value pairs through the application programming interface server.

F15. The system of any one of F12 and F13, wherein the backup controller accesses the topological order and key-value pairs without using the application programming interface server.

F16. The system of any one of F12 to F15, wherein the containerized orchestration based service is implemented in a Kubernetes (K8s) system and the backup controller is associated with another K8s cluster different than the K8s cluster.

F17. The system of any one of F12 and F16, wherein the linear order comprises a linear time order.

F18. The system of any one of F12 and F17, wherein the instructions cause the one or more processing devices to determine the linear order by parsing the one or more key-value pairs when written to a write ahead log (WAL) and creating the linear order based on timestamps associated with when the key-value pairs are written to the WAL.

F19. The system of any one of F12 and F18, wherein the instructions cause the one or more processing devices to determine the dependencies by determining a relationship between a first control plane object and a second control plane object based on first WAL values saved at a first instant in time and second WAL values saved at a second instant in time.

F20. The system of any one of F12 and F19, wherein the first instant in time and the second instant in time comprise timestamps associated with the first and second WAL values.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for restoring a container orchestration system based service, comprising:
   determining a first order of a plurality of control plane objects that support the container orchestration system based service, wherein determining the first order comprises processing a monotonically increasing integer associated with a plurality of create, update and delete (CUD) orders;
   determining a dependency between a first control plane object and a second control plane object of the plurality of control plane objects, the first control plane object being associated with a first instant in time and the second control plane object being associated with a second instant in time, the second instant in time occurring after the first instant in time;
   generating a second order comprising the first control plane object and the second control plane object based on the first order and the dependency; and
   using the first order and a topological order to restore the container orchestration system based service.

2. The method of claim 1, wherein the first order comprises a linear time order.

3. The method of claim 1, wherein determining the first order comprises parsing one or more key-value pairs written to a write ahead log (WAL) and creating the first order based on timestamps associated with the key-value pairs.

4. The method of claim 3, wherein determining the dependency comprises determining a relationship between the first control plane object and the second control plane object based on first WAL values saved at the first instant in time and second WAL values saved at the second instant in time.

5. The method of claim 4, wherein the first instant in time and the second instant in time comprise timestamps associated the first and second WAL values.

6. The method of claim 1, wherein each integer is associated with when a given key was added as a member to an etcd state.

7. The method of claim 1, wherein the container orchestration system based service comprises one or more applications running in one or more Kubernetes containers.

8. The method of claim 1, wherein the container orchestration system based service comprises one or more workloads running in one or more Kubernetes containers.

9. The method of claim 1, wherein determining the first order comprises determining a linear order based on one or more object mutations associated with the plurality of control plane objects.

10. The method of claim 1, wherein the second order comprises a topological order.

11. A system for restoring a containerized orchestration based service, comprising:
    a first set of controllers associated with a containerized orchestration cluster;
    a key-value database storing key-value pairs for a plurality of control plane objects associated with the containerized orchestration cluster;
    a memory storing instructions;
    one or more processing devices coupled to the memory such that the instructions cause the one or more processing to:
      determine a linear order of the plurality of control plane objects based on the key-value pairs and one or more timestamps associated with the key-value pairs,
      determine dependencies between the plurality of control plane objects,
      generate a topological order associated with the plurality of control plane objects based on the linear order and the dependencies; and
    a backup controller that accesses the topological order and key-value pairs to restore the containerized orchestration based service, wherein the backup controller accesses the topological order and key-value pairs without use of an application programming interface server.

12. The system of claim 11, further comprising the application programming interface server.

13. The system of claim 11, wherein the containerized orchestration based service is implemented in a Kubernetes (K8s) system and the backup controller is associated with another K8s cluster different than the K8s cluster.

14. The system of claim 11, wherein the linear order comprises a linear time order.

15. The system of claim 11, wherein the instructions cause the one or more processing devices to determine the linear order by parsing the one or more key-value pairs when written to a write ahead log (WAL) and creating the linear order based on timestamps associated with when the key-value pairs are written to the WAL.

16. The system of claim 15, wherein the instructions cause the one or more processing devices to determine the dependencies by determining a relationship between a first control plane object and a second control plane object based on first WAL values saved at a first instant in time and second WAL values saved at a second instant in time.

17. The system of claim 16, wherein the first instant in time and the second instant in time comprise timestamps associated with the first and second WAL values.

* * * * *